(12) United States Patent
Rasmussen et al.

(10) Patent No.: US 10,968,642 B1
(45) Date of Patent: Apr. 6, 2021

(54) SIDING TOOL

(71) Applicant: CHADILLAC 10 SIDING TOOL LLC, Garden City, ID (US)

(72) Inventors: Chad Rasmussen, Meridian, ID (US); Steven Evans, Garden City, ID (US)

(73) Assignee: Chadillac 10 Siding Tool LLC, Garden City, ID (US)

( * ) Notice: Subject to any disclaimer, the term of this patent is extended or adjusted under 35 U.S.C. 154(b) by 0 days.

(21) Appl. No.: 17/087,387

(22) Filed: Nov. 2, 2020

Related U.S. Application Data (60) Provisional application No. 62/983,150, filed on Feb. 28, 2020.

(51) Int. Cl.
*E04F 21/18* (2006.01)
*G01B 5/00* (2006.01)
*G01B 3/04* (2006.01)

(52) U.S. Cl.
CPC ...... *E04F 21/1855* (2013.01); *E04F 21/1877* (2013.01); *G01B 3/04* (2013.01); *G01B 5/0004* (2013.01); *Y10S 52/01* (2013.01); *Y10S 269/904* (2013.01)

(58) Field of Classification Search
CPC .................................................. E04F 21/1855
USPC ..................... 33/647, 33, 649, 646, 648, 566
See application file for complete search history.

(56) References Cited

U.S. PATENT DOCUMENTS

| | | | | |
|---|---|---|---|---|
| 92,563 | A * | 7/1869 | Barn ................... | E04F 21/1855 33/646 |
| 418,754 | A * | 1/1890 | Schill .................. | E04F 21/1855 33/646 |
| 3,792,852 | A | 2/1974 | Reniker | |
| 5,094,007 | A * | 3/1992 | Gordon ................. | E04D 15/025 33/646 |
| 5,203,090 | A * | 4/1993 | Bouska ............... | E04F 21/1855 33/33 |
| 5,305,532 | A * | 4/1994 | Johnson ................... | G01B 3/30 33/18.1 |
| 5,400,519 | A * | 3/1995 | Meyer ................. | E04F 21/1855 33/646 |
| 5,408,757 | A | 4/1995 | Lenz | |
| 5,465,499 | A | 11/1995 | LaPlante | |
| 5,623,767 | A | 4/1997 | Colavito | |
| 6,705,021 | B2 | 3/2004 | Nadal et al. | |

(Continued)

OTHER PUBLICATIONS https://www.youtube.com/watch?v=tEGzZqDq2oA—PacTool Gecko Gauge USA Retrieved from the internet on Dec. 7, 2020.

(Continued)

*Primary Examiner* — Christopher W Fulton
(74) *Attorney, Agent, or Firm* — Parsons Behle & Latimer (57) ABSTRACT

A siding tool for siding installation in building construction to efficiently measure the distance between adjacent siding panels and to install siding. The body of the siding tool is preferably approximately ³⁄₁₆" (³⁄₁₆ inches) wide, and a depth of approximately two inches (2"). The width and depth are used to measure distances according to building code. The body has a lip at one end that extends from the base of the body. The lip is configured to position the siding tool in place by catching the bottom edge of a panel of siding that has been placed. The lip of the siding tool is also configured for a user to position the siding tool upside down and use the lip to draw measurement lines.

23 Claims, 9 Drawing Sheets

(56) References Cited

U.S. PATENT DOCUMENTS

| | | | |
|---|---|---|---|
| 6,848,192 B2 | 2/2005 | Partin | |
| 7,134,253 B2 | 11/2006 | Edwards et al. | |
| 7,159,328 B1 * | 1/2007 | Duda | B25H 7/04 |
| | | | 33/370 |
| 7,490,447 B2 | 2/2009 | Ouellette et al. | |
| 9,206,613 B2 * | 12/2015 | Walker | E04F 21/1855 |
| 2002/0100181 A1 * | 8/2002 | Evans | E04F 21/1855 |
| | | | 33/647 |
| 2003/0101611 A1 * | 6/2003 | Bueno | E04D 15/025 |
| | | | 33/647 |
| 2004/0010929 A1 * | 1/2004 | Whitford | E04D 15/025 |
| | | | 33/649 |
| 2004/0020066 A1 | 2/2004 | Morey | |
| 2008/0301966 A1 | 12/2008 | Walther | |
| 2013/0205712 A1 * | 8/2013 | Butler | E04F 21/1855 |
| | | | 52/749.1 |
| 2019/0191839 A1 * | 6/2019 | Aquino | B25H 3/02 |

OTHER PUBLICATIONS https://www.youtube.com/watch?v=nc5LF7rzPj8; A siding gauge for LP SmartSide Lap, and Shake siding; Retrieved from the internet on Dec. 10, 2020.

* cited by examiner

SIDING TOOL

PRIORITY/CROSS-REFERENCE TO RELATED APPLICATIONS

This application claims the benefit of U.S. Provisional Application No. 62/983,150, filed Feb. 28, 2020, the disclosure of which is incorporated by reference in its entirety.

TECHNICAL FIELD

The embodiments described herein relate generally to construction tools. More particularly, the disclosure relates to tools and methods for installing siding.

BACKGROUND

Siding is the protective material attached to exterior walls of buildings and acts as the first protective line of defense against exterior elements. In order to effectively protect a building when installed, siding panels should be installed level across the wall. Current methods of installing siding typically utilize a chalk snap line, laser levels, or having a user mark a line using a block to slide across an installed siding panel. Some siding tools clamp to already installed panels of siding and/or include moving parts that may break. Other disadvantages with known siding installation methods and tools may exist.

SUMMARY

The present disclosure is directed to methods and systems that overcome or lessen some of the problems and disadvantages discussed above. Not all embodiments provide the same advantages or the same degree of advantage. The purpose of the summary is to enable the public, and especially the scientists, engineers, and practitioners in the art who are not familiar with patent or legal terms or phraseology, to determine the nature and essence of the technical disclosure of the application.

What is disclosed is an improved siding tool used for siding installation in building construction to efficiently measure the distance between adjacent siding panels and to install siding.

One embodiment of a siding tool has a generally flat body. The body of the siding tool is preferably 3/16" (3/16 inches) wide and a depth of 2" (two inches). The body has a lip at one end that extends from the base of the body. The lip is configured to position the siding tool in place by catching the bottom edge of a siding panel that has been placed. The lip of the siding tool may also permit a user to invert the siding and use the lip to draw measurement lines at a fixed height.

In some embodiments, the top edge of the siding tool body is generally flat. In alternate embodiments, the top edge can include other shape constructions configured to receive and secure a siding panel. The top edge of the body is configured to receive and mount adjacent panels of siding to be installed. The distance of the body between the lip and the top edge creates a reveal distance between adjacent panels of siding when installed.

In some embodiments, the body has a generally semicircular indentation at the angle where the lip converges with the body of the siding tool. The semicircular indentation is configured to catch the bottom edge of a siding panel. When the bottom edge of the siding panel is placed into contact with the lip, the indentation permits the bottom edge of the siding panel to make full contact with the lip to permit an accurate reveal distance to be used. The semi-circular indentation may inhibit the received siding panel from sliding upwards off the lip of the siding tool.

In some embodiments, the body defines an opening. The opening is preferably positioned longitudinally within the body of the siding tool. The opening preferably extends approximately 3/4 of the length of the siding tool. The opening is configured for a user to insert their fingers within the opening, allowing a user to position the siding tool against the siding panel. In other embodiments, the opening can extend any other length sufficient enough for a user to insert at least one finger within the opening.

In some embodiments, the body defines a marking groove within the edge of the opening. When the siding tool is placed vertically and flat against a siding panel or a wall, such that the base of the siding tool is flush with a lower edge, the marking groove allows a user to draw a line across the wall or siding at a fixed height. The fixed height is preferably the height that the next siding panel is intended to cover. The height of the groove may vary depending on local building codes. The marking groove may be longitudinally spaced from one of the ends of the body by six inches. In an alternate embodiment, the marking groove may be positioned within the exterior perimeter of the body.

In some embodiments, the depth of the body is approximately two inches. The depth of the body is also configured to measure or space out the lap siding below an overhang, such as the roof.

In some embodiments, the body defines a bottle opener in the edge of the opening.

In some embodiments, the length of the siding tool has measurement markings, allowing a user to measure distances. The measurement markings can be metric measurements, U.S. customary measurements, or other measurement systems known in the art.

In some embodiments, the body defines a second opening. The second opening is configured to provide a utility attachment point such that a user can safely secure the siding tool with a utility belt, key chain, or lanyard.

Alternate embodiments of the siding tool can be used to install shake siding and HardiePlank® siding or to install shake siding and LP® Smartside® trim and siding. In an embodiment configured for installing LP® Smartside®, the reveal distance is fixed with a 6.875" lap. In an embodiment configured for installing HardiePlank® siding, the reveal distance is fixed with a 7" lap.

Several methods of utilizing a siding tool are also disclosed. These methods include, for example, a method of using a siding tool, having a step of providing a siding tool. The siding tool has a body with a first end and a second end. The body has a length, a width, and a depth. The body has a lip proximate to the second end, and the lip is configured for engaging the bottom of an installed first siding panel. The first end of the body is configured for receiving a second siding panel so that the second siding panel is in position to be installed. The body is configured to create a reveal distance on the installed siding panel between the lip and the first end.

The method of using the siding tool includes the step of engaging the lip with the bottom edge of an installed siding panel, the step of placing a siding plank on the first end of the siding tool, and the step of installing the siding plank in a preferred position such that a reveal distance is created between the first end and the lip.

In some embodiments, the method of using a siding tool includes the additional step of providing a siding tool body defining an opening. The opening is configured for a user to insert one or more of the user's fingers. In this embodiment, the method includes the additional step of the user placing the user's finger through the opening to position the siding tool and install the second siding panel.

In some embodiments, the method of using a siding tool includes the step of providing a siding tool with a body defining a marking groove. The marking groove is configured for a user to mark a measurement marker when the siding tool is placed with the depth positioned flat against a wall or an installed siding panel. In this embodiment, the method of using a siding tool includes the step of placing the siding tool flat against a wall or an installed siding panel, and the additional step of marking the installed siding or wall by using the groove.

In some embodiments, the method of using a siding tool includes the additional step of using the width of the siding tool to measure the distance between an installed siding panel and the trim or edge of an exterior of a building. The width is configured to be an accurate measurement for building code so that the siding tool can quickly determine the correct length between the siding tool that is installed and the edges. The width may be 3/16 inches.

In some embodiments, the method of using a siding tool includes the additional step of providing a siding tool having a depth of two inches, and the additional step of measuring a distance between the roof and an installed siding panel with the depth of the siding tool.

In some embodiments, the method of using a siding tool includes the additional step of the user placing the siding tool on an installed siding panel in an inverted position. In this embodiment, the method includes the additional step of a user to mark a measurement using the lip of the siding tool.

While the disclosure is susceptible to various modifications and alternative forms, specific embodiments have been shown by way of example. The features, functions, and advantages that have been discussed can be achieved independently in various embodiments or may be combined in yet other embodiments further details of which can be seen with reference to the drawings and the following description. However, it should be understood that the disclosure is not intended to be limited to the particular forms disclosed. Rather, the intention is to cover all modifications, equivalents and alternatives falling within the scope of the disclosure as defined by the appended claims.

Furthermore, it should be understood that the figures herein are not necessary drawn to scale or uniform and certain features may be exaggerated for ease of illustration. The shapes, sizes, configurations, and/or locations of elements are shown for illustrative purposes and may be varied as would be appreciated by one of ordinary skill in the art having the benefit of this disclosure.

DETAILED DESCRIPTION OF THE EMBODIMENTS

Figure 1:
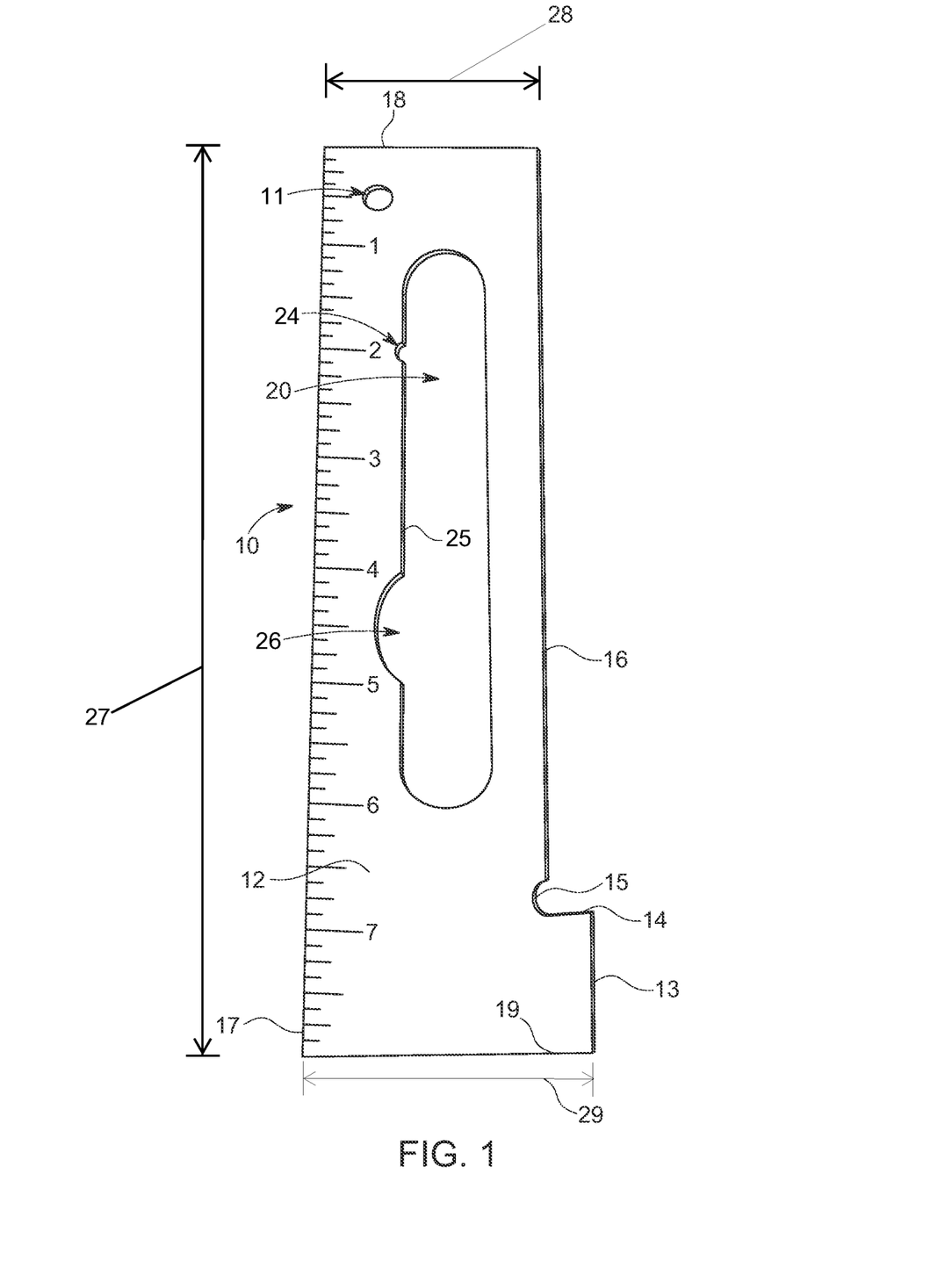
FIG. 1 is a perspective view of an embodiment of a siding tool.

FIG. 1 illustrates an embodiment of a siding tool 10 used for siding installation during building construction to efficiently measure the distance between adjacent siding panels and install siding. The siding tool 10 is formed of a generally flat body 12. The siding tool 10 may comprise a single, unitary piece and has no moving parts. The siding tool 10 may be formed of metal. Preferably, the siding tool 10 comprises a single, machined piece of metal. The body 12 may be substantially rectangular in shape with a notch along one side. The body 12 includes a first end 18, a second end 19, and a length 27 extending between the first end 18 and the second end 19. The first end 18 forms a top edge and the second end 19 forms a bottom edge. The bottom edge at the second end 19 may be parallel to the top edge at the first end 18. The length 27 may be greater than seven inches (7"). Preferably, the length 27 is eight inches (8").

The body 12 includes a first side 17 and a second side with a depth extending between the first side 17 and the second side. The depth 28 at the first end 18 may be two inches (2"). The first side 17 extends from the first end 18 to the second end 19. The second side extends from the first end 18 to the second end 19 opposite from the first side 17. The second side comprises a first portion 13 that is closer to the bottom edge at the second end 19 than the top edge at the first end 18, a second portion 16 that is closer to the top edge than the bottom edge, and a lip 14 that connects the first portion 13 to the second portion 16. The lip 14 is not parallel to the first portion 13 or the second portion 16. A lateral distance (e.g. depth 28) between the second portion 16 and the first side 17 is smaller than a lateral distance (e.g. depth 29) between the first portion 13 and the first side 17. Stated another way, the body 12 may be generally rectangular in shape extending from the first end 18 to the second end 19 and from the first side 17 to the second portion 16 of the second side. A portion of the body 12 at the second end 19 extends laterally beyond the second portion 16 to form a first portion 13 and a lip 14 that forms an edge extending between the first portion 13 and the second portion 16.

The first end 18 extends from the first side 17 to the second portion 16 of the second side. The second end 19 extends from the first side 17 to the first portion 13 of the second side. The first portion 13 may be parallel to the second portion 16. The first portion 13 may be parallel to the first side 17. The second portion 16 may be parallel to the first side 17. The lip 14 may be perpendicular to the second portion 16.

The lip 14 is used to catch a bottom edge of an installed siding panel. The body 12 above the lip 14 creates a reveal distance for adjacent edges of siding panels. The reveal distance is fixed. As used herein "fixed" means "predetermined and not subject to or able to be changed."

Figure 7:
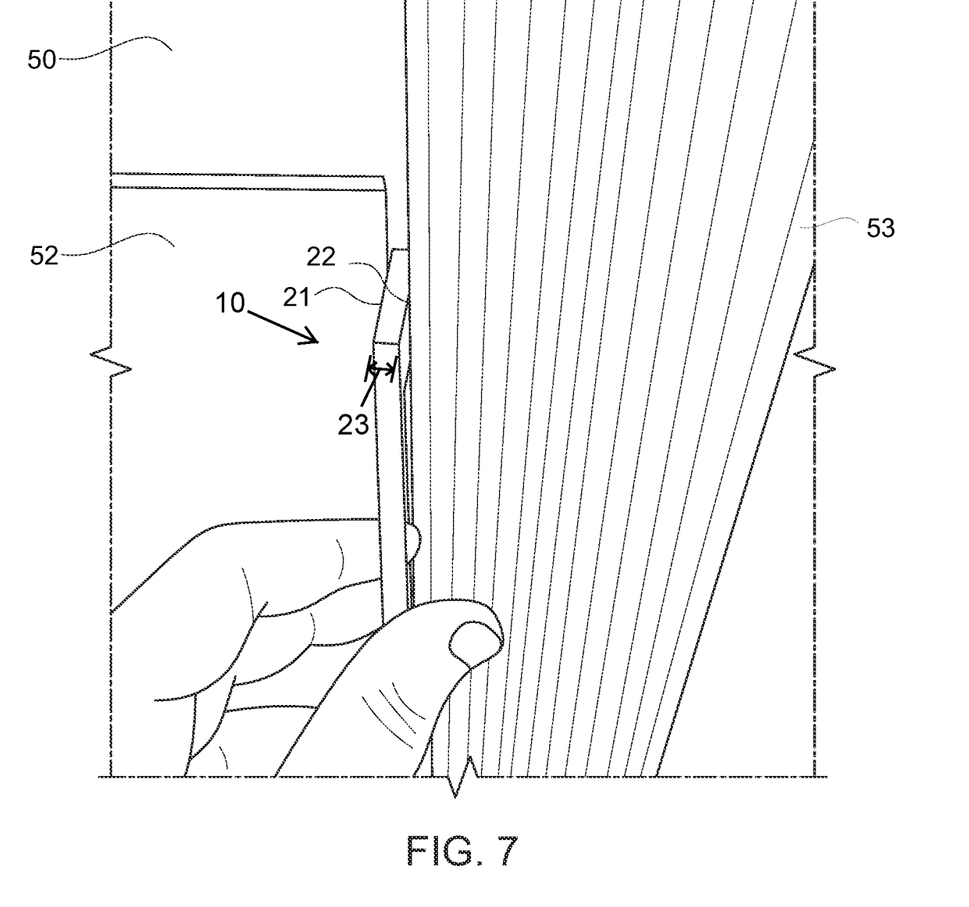
FIG. 7 is a rear view of an embodiment of a siding tool in use for measurement for the installation of a siding panel.

The body 12 may include a semicircular indentation 15 at the angle where the lip 14 converges with second portion 16 of the second side of the 12 body. The semi-circular indentation 15 inhibits the received siding panel from sliding upwards off the lip 15 of the siding tool 10 and enables the bottom edge of a siding panel to make full contact with the lip 14 to permit an accurate reveal distance to be used. As shown in FIG. 7, the body 12 includes a first face 21, a second face 22 opposite the first face 21, and a width 23 (shown in FIG. 7) extending between the first face 21 and the second face 22. The first face 21 may be parallel to the second face 22. The first face 21 and the second face 22 each extend from the first end 18 to the second end 19 and from the first edge 17 to the second edge (first portion 13 and second portion 16). The width 23 may be three-sixteenths inches (3/16").

Referring again to FIG. 1, the top edge 18 at first end 18 of the siding tool 10 may be generally flat. In other embodiments, the top edge can be any construction configured to receive a siding plank. The top edge at first end 18 of the siding tool 10 is configured such that when the lip 14 is placed under the bottom edge of already placed siding plank, the top edge at first end 18 will position the next siding plank for installation.

The siding tool 10 may include an elongated opening 20 extending along a portion of the length 27 within the body 12 of the siding tool 10. The elongated opening 20 is defined by an interior edge 25 and extends through the width 23 (shown in FIG. 7) of the body 12. The elongated opening 20 extends a length sufficient for a user to insert at least one finger. The elongated opening 20 preferably extends approximately 3/4 of the length of the siding tool 10. The elongated opening 20 may have a depth of at least 3/4". The elongated opening 20 allows a user to place their finger(s) within the elongated opening 20 to hold and position the siding tool 10 against the siding. In some embodiments, the siding tool 10 may include a bottle opener 26 intersecting with the interior edge 25 of the elongated opening 20. The bottle opener 26 extends through the width 23 (shown in FIG. 7) of the body 12. The bottle opener 26 may be a semicircular opening have a recessed rim.

In some embodiments, the elongated opening 20 has a marking groove 24 approximately two inches (2") from the top edge at first end 18 of the siding tool 10. The marking groove 24 extends through the width 23 (shown in FIG. 7) of the body 12. When the siding tool 10 is placed vertically and flat on its side against siding or a wall, the marking groove 24 allows a user to draw a line across the wall or siding at a fixed height. In some embodiments, the marking groove 24 is longitudinally spaced from one of the ends 18, 19 of the body 12 by six inches.

In an embodiment where the reveal distance from lip 14 to first end 18 is seven inches, the siding tool 10 may be used to measure for various types of siding. The entire height 27 may be used to measure for eight-inch shake siding by placing either the first end 18 or the second end 19 against a bottom surface and drawing a mark along the depth at the other end. Furthermore, when a user places the siding tool 10 against a surface in an inverted position, the user can measure for seven-inch shake siding by placing a mark along the lip 14 while the first end 18 is placed against a bottom surface. Using the same tool, a user can measure for six-inch shake siding by placing the second end 19 against a bottom surface and placing a mark at the marking groove 24. The marks can be used to align the next siding panel in preparation for installation.

The body 12 may have a second opening 11. The second opening 11 provides an attachment point for the siding tool 10 to be easily attached to a utility attachment, such as a user's utility belt, lanyard, or key chain.

Figure 2:
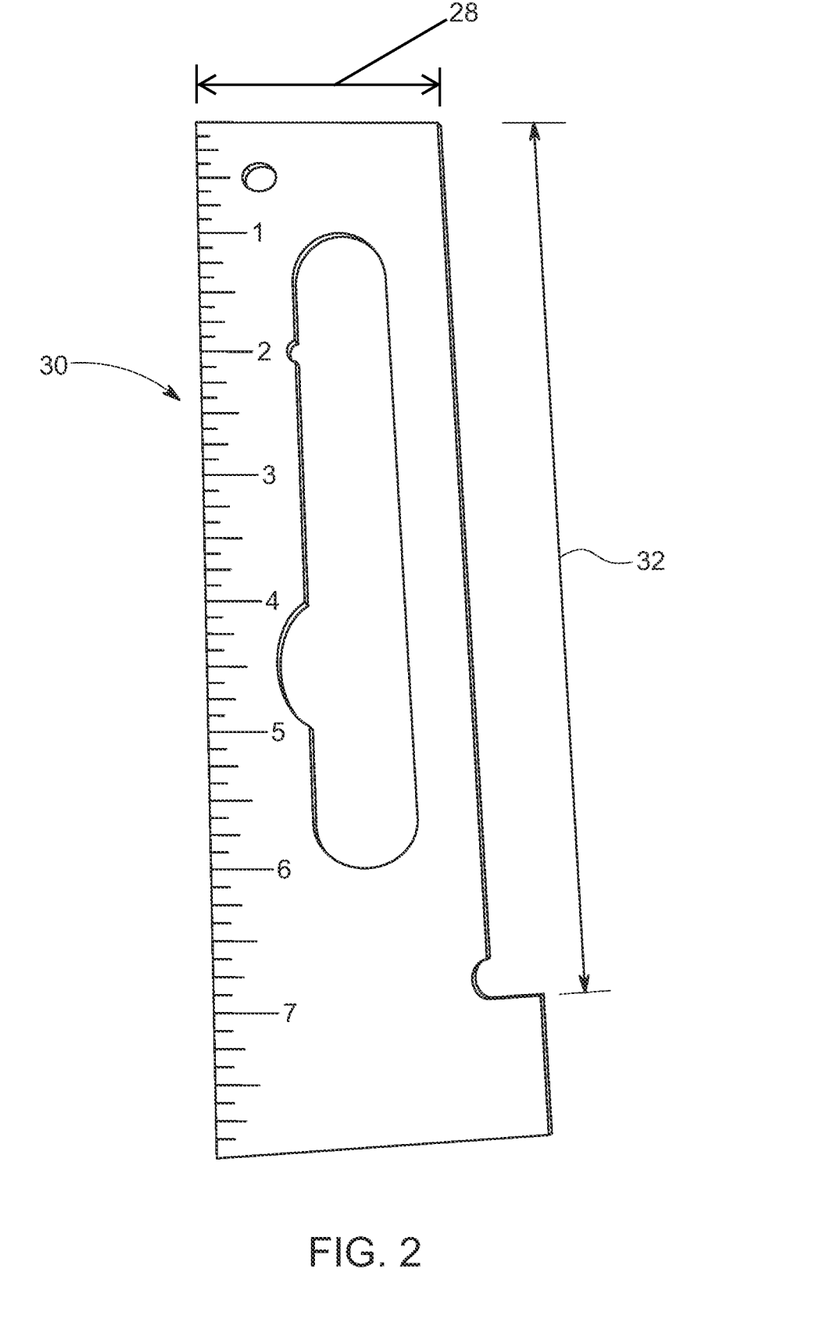
FIG. 2 is a perspective view of an alternate embodiment of a siding tool.
Figure 3:
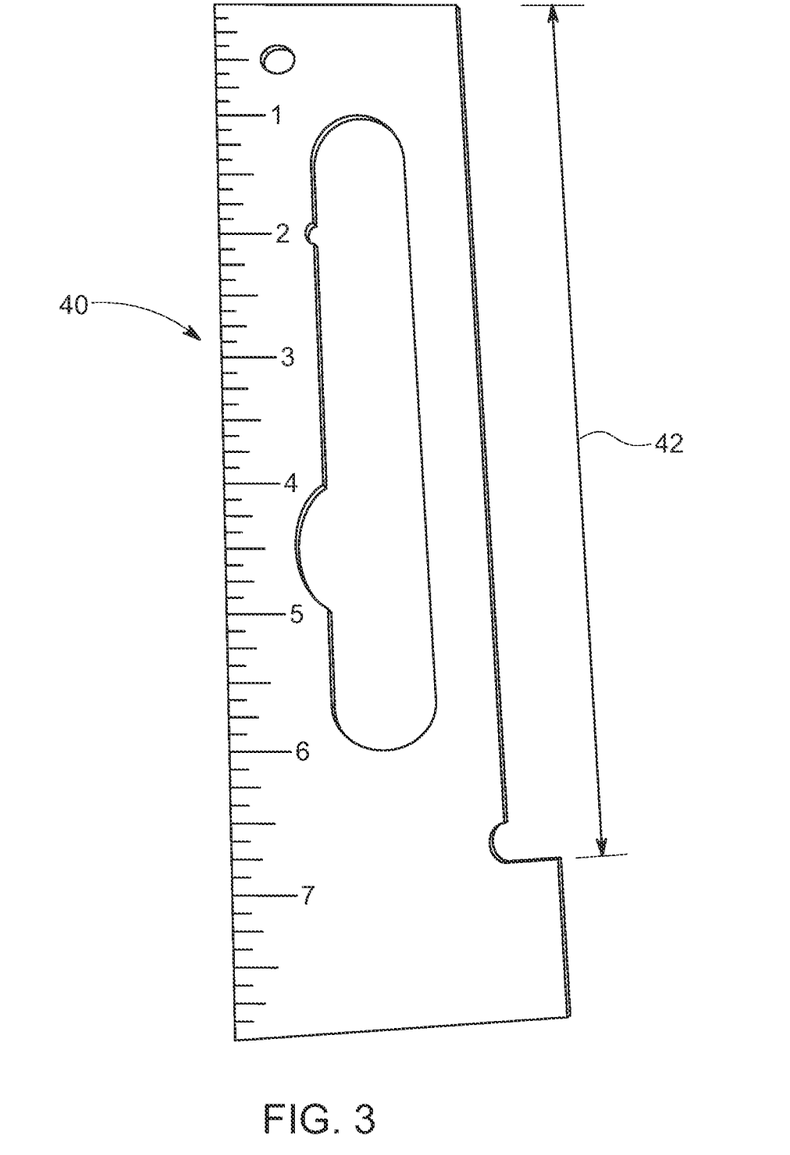
FIG. 3 is a perspective view of an alternate embodiment of a siding tool.

In some embodiments, the siding tool 10 is used to place and install shake siding. FIG. 2 illustrates an alternate embodiment of a siding tool 30 that can be used to install both shake siding and LP® Smartside® siding. Siding tool 30 may be similar to siding tool 10 and the reveal distance 32 is fixed with a 6.875" lap. FIG. 3 illustrates an alternate embodiment of the siding tool 40 can be used to install both shake siding and HardiePlank® siding. Siding tool 30 may be similar to siding tool 10 and the reveal distance 42 is fixed with a 7" lap.

Figure 4:
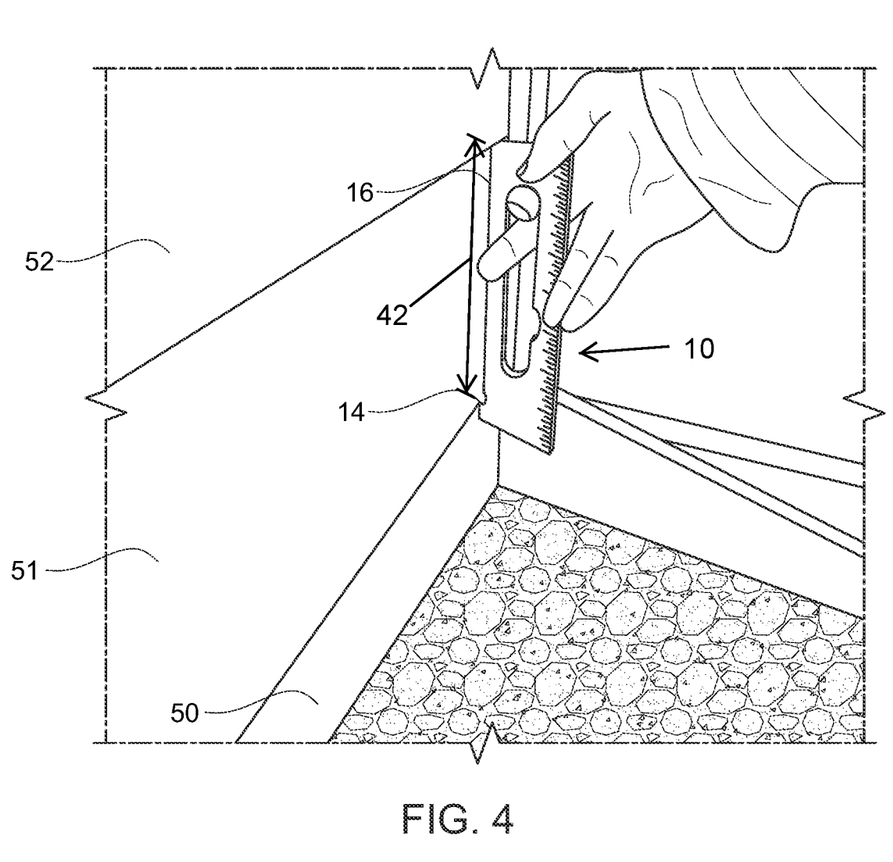
FIG. 4 is a side perspective view of an embodiment of a siding tool in use for the installation a siding panel.
Figure 5:
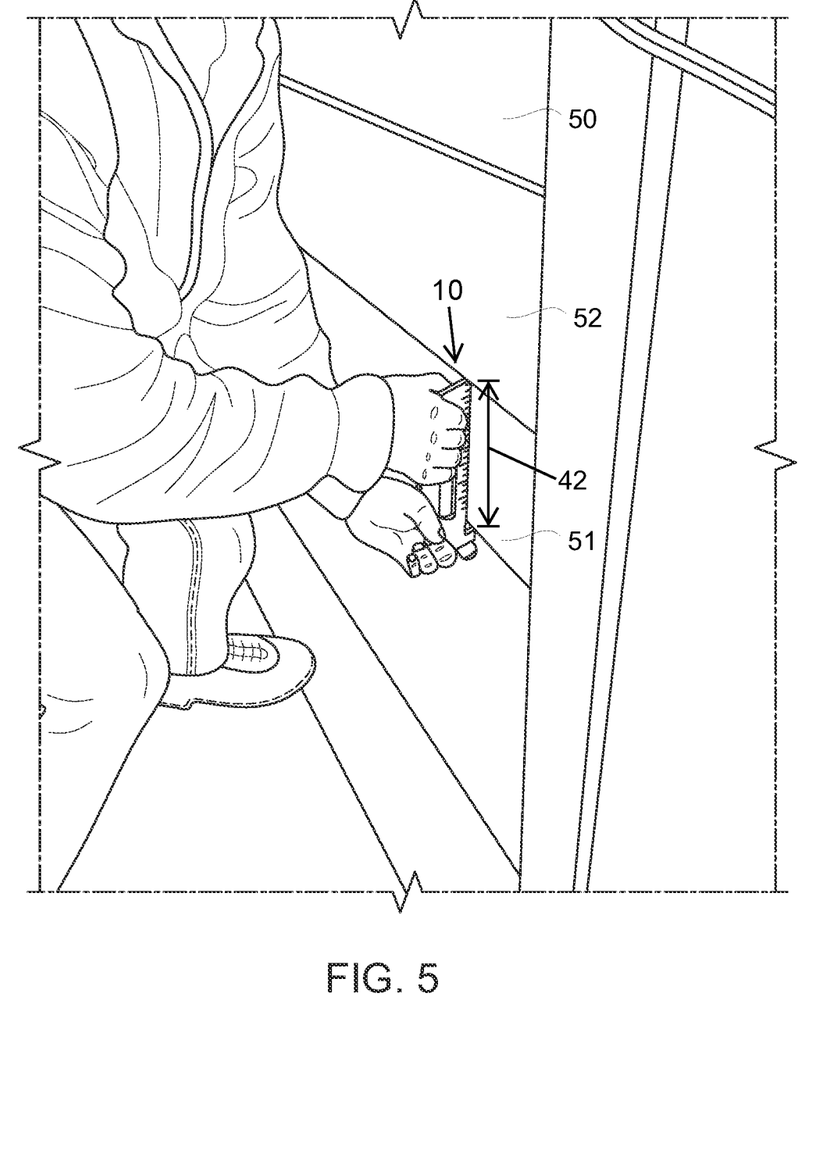
FIG. 5 is a side perspective view of an embodiment of a siding tool in use for the installation a siding panel.

FIGS. 4 and 5 illustrate a method of installing a siding plank 52. A user grasps the siding tool 10 through the elongated opening 20 and places the lip 14 below the bottom edge of a siding plank 51 already installed on the wall 50. The second portion 16 of the second side of the body 12 is pressed against the installed siding plank 51. A second siding plank 52 is then placed on the top edge of the siding tool 10, positioning the second siding plank 52 to be installed. The siding tool 10 creates a reveal distance 42 between the siding planks 51, 52.

Figure 6:
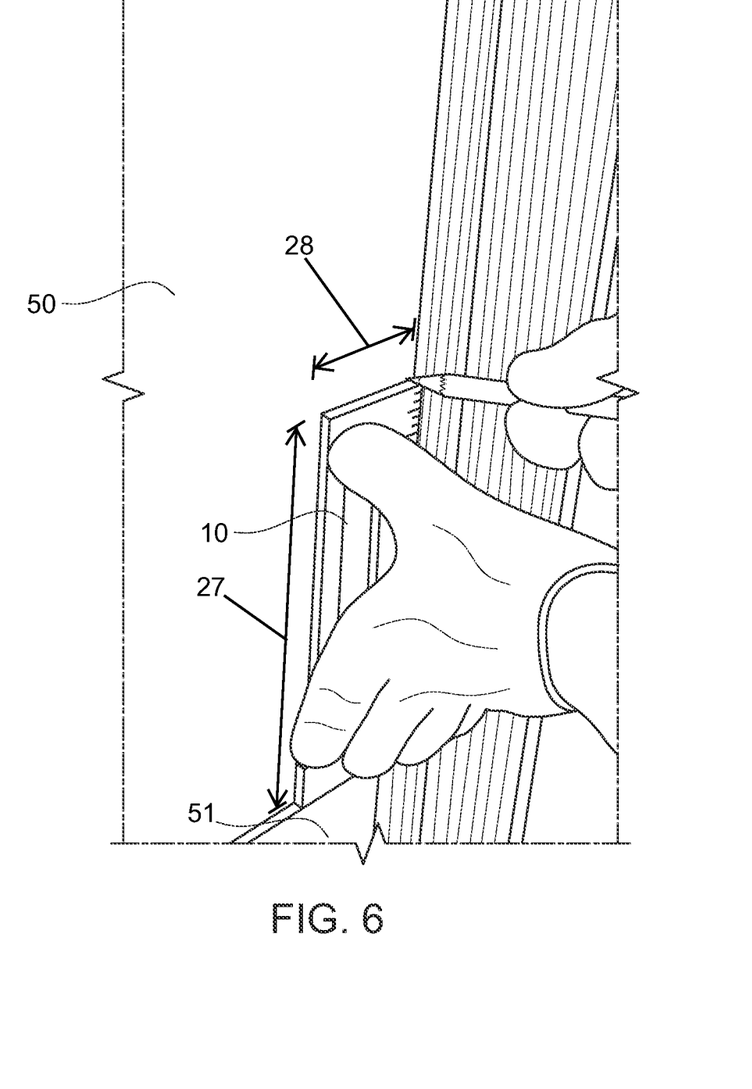
FIG. 6 is a side perspective view of an embodiment of a siding tool in use for measurement for the installation of a siding panel.

FIG. 6 depicts the siding tool 10 in use to measure a top point of where a siding plank should be installed. A user positions the bottom edge of the siding tool 10 against the top edge of siding plank 51 such that it can measure the height 27 by drawing across the depth 28.

FIG. 7 depicts the siding tool 10 in use to space siding approximately 3/16" between the siding plank 52 being installed and the trim 53 by using the width 23 of the siding tool 10. This allows the builder to create a gap between the siding plank 52 and the trim 53. The user maintains the gap while affixing the siding plank 52 to the wall 50.

Figure 8:
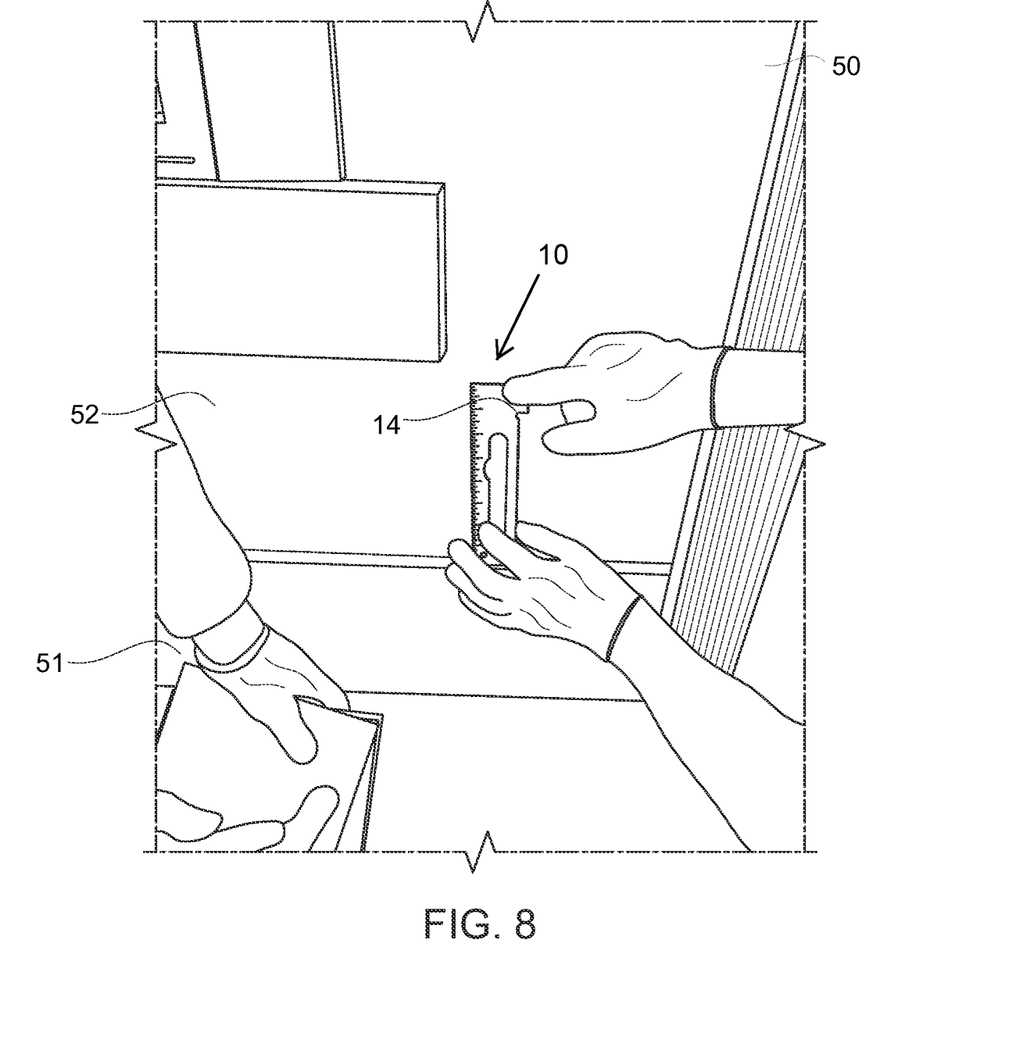
FIG. 8 is a top perspective view of an embodiment of a siding tool in use for the installation of a siding panel.

FIG. 8 depicts the siding tool 10 being used to measure a distance in order to line up a siding panel 52. The bottom edge of the siding tool 10 is placed flat against the wall 50 and the bottom edge is flat against an installed siding panel 51. FIG. 8 also illustrates the siding tool 10 in an inverted position. A user can make a mark by i) using the measurement markings along the first side, ii) using the lip 14 to use a predetermined measurement having a fixed reveal distance, or iii) at the top of the siding tool 10 to use a predetermined measurement of the height of the siding tool 10.

Figure 9:
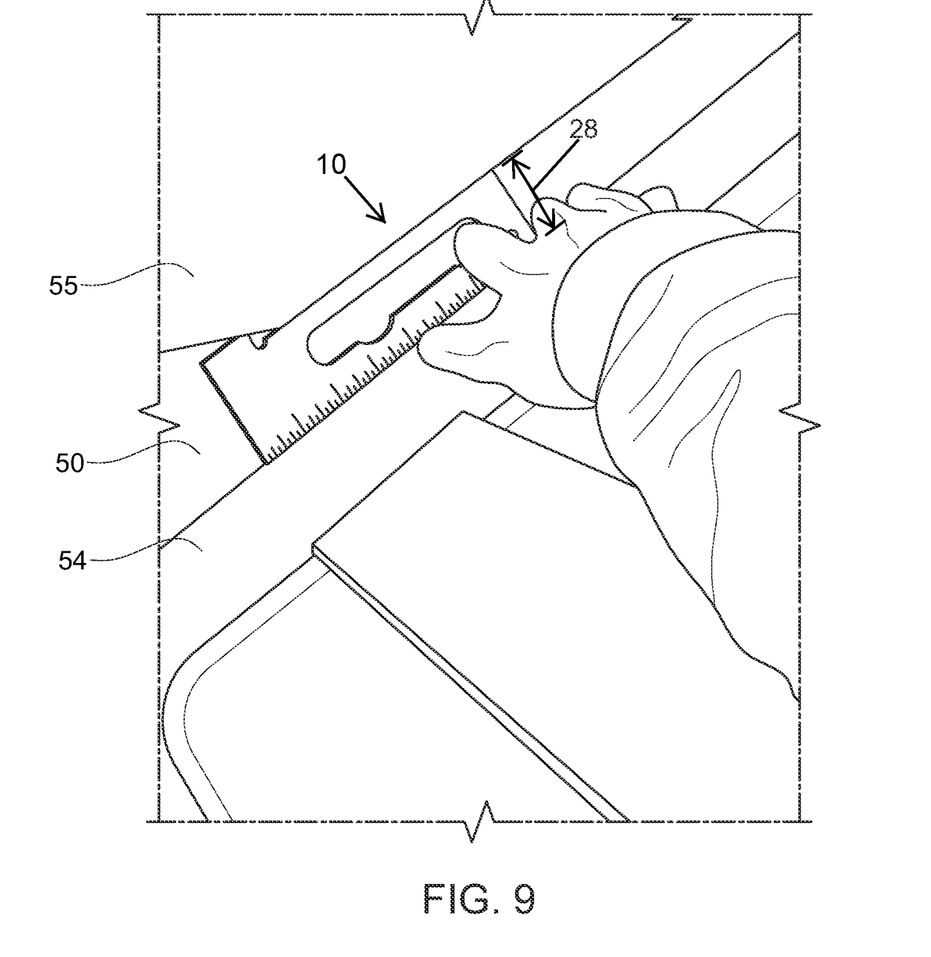
FIG. 9 is a side perspective view of an embodiment of a siding tool in use for the installation of a siding panel.

FIG. 9 depicts a user using the depth 28 of the siding tool 10 to create a gap between the roof 55 and a first layer of siding 54. The user maintains the gap while affixing the siding plank 54 to the wall 50.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

We claim:

1. A siding tool configured for installing siding, the siding tool comprising:
   a body, the body having a first end and a second end, wherein the body comprises a length, a width, and a depth;
   a lip converging with the body and proximate to the first end, the lip being configured for engaging a bottom of an installed first siding panel, wherein the body comprises an indentation proximate to where the lip converges with the body; and
   the second end is configured for receiving a second siding panel such that the second siding panel is positioned for installation, wherein the body is configured to create a reveal distance between the lip and the second end, wherein the reveal distance is fixed.

2. The siding tool of claim 1 wherein the body defines an elongated opening, wherein the elongated opening is sized for a user to insert the user's fingers to position the siding tool.

3. The siding tool of claim 2, wherein the body defines a groove, wherein the groove is configured for a user to mark a measurement when the siding tool is placed with the depth positioned flat against a wall or the first siding panel, wherein the groove intersects with the elongated opening.

4. The siding tool of claim 2, further comprising a bottle opener that intersects with the elongated opening.

5. The siding tool of claim 1, wherein the width is 3/16 inches.

6. The siding tool of claim 1, wherein the body defines a groove, wherein the groove is configured for a user to mark a measurement when the siding tool is placed with the depth positioned flat against a wall or the first siding panel.

7. The siding tool of claim 6, wherein the groove is spaced 6 inches from one of the first end and the second end of the body.

8. The siding tool of claim 1, wherein the siding tool defines a utility opening, wherein the utility opening is configured for attaching a utility attachment.

9. The siding tool of claim 1, wherein the reveal distance is 6.875 inches.

10. The siding tool of claim 1, wherein the reveal distance is 7 inches.

11. The siding tool of claim 1, wherein the depth at the second end of the body is 2 inches.

12. The siding tool of claim 1, wherein the second end forms a top edge.

13. The siding tool of claim 12, wherein the first end forms a bottom edge, a length extending between the top edge and the bottom edge, and the length is eight inches.

14. A siding tool configured for installing siding, the siding tool comprising:
    a body having:
        a first end;
        a second end configured for receiving a second siding panel such that the second siding panel is in a position to be installed;
        a length extending from the first end to the second end;
        a width of 3/16 inches, the width perpendicular to the length;
        a depth perpendicular to the length and perpendicular to the width, the depth extending from a first side to a second side;
        an elongated opening sized for a user to insert the user's fingers to position the siding tool, wherein the elongated opening is defined by an interior edge of the body;
        a lip proximate to the first end, the lip being configured for engaging a bottom of an installed first siding panel;
        a reveal distance between the lip and the second end, a portion of the second side extends continuously along the reveal distance, wherein the reveal distance is fixed; and
        an indentation proximate to where the lip converges with the portion of the second side of the body.

15. The siding tool of claim 14, wherein the body defines a groove, the groove intersecting with the interior edge, wherein the groove is configured for a user to mark a measurement when the siding tool is placed with the depth positioned flat against a wall or the first siding panel.

16. The siding tool of claim 15, wherein the groove is spaced 6 inches from one of the first end and the second end of the body.

17. A method of installing siding, the method comprising:
    providing a siding tool, wherein the siding tool comprises a body, the body having a first end, a second end, a length, a width, a depth, and a lip proximate to the first end, the lip being configured for engaging a bottom of a first siding panel previously installed on a wall, the second end is configured for receiving a second siding panel such that the second siding panel is in position to be installed, and the body creates a fixed reveal distance between the lip and the second end;
    engaging the lip with a bottom of the first siding panel;
    placing a second siding panel on the second end of the siding tool;
    installing the second siding panel; and
    using the width to measure a gap between the second siding panel and a trim panel of an exterior of a building.

18. The method of claim 17, wherein the body defines a groove spaced 6 inches from one of the first end and the second end of the body, and the method further comprises:
    placing the depth of the body flat against the wall or the first siding panel; and
    marking the wall or the first siding panel through the groove.

19. The method of claim 17, wherein the width is 3/16 inches.

20. The method of claim 17, wherein the body defines an elongated opening, and the method further comprises placing a user's fingers through the elongated opening to hold the siding tool while installing the second siding panel.

21. The method of claim 17, wherein the method comprises:
    positioning the siding tool in an inverted position flat against the wall or the first siding panel; and
    marking a measurement on the wall or the first siding panel using the lip.

22. A method of installing siding, the method comprising:
    providing a siding tool, wherein the siding tool comprises a body, the body having a first end, a second end, a length, a width, a depth, and a lip proximate to the first end, the lip being configured for engaging a bottom of a first siding panel previously installed on a wall, the second end is configured for receiving a second siding panel such that the second siding panel is in position to be installed, and the body creates a fixed reveal distance between the lip and the second end, wherein the depth is 2 inches;
    engaging the lip with a bottom of the first siding panel;
    placing a second siding panel on the second end of the siding tool;
    installing the second siding panel; and
    measuring a gap with the depth of the siding tool.

23. The method of claim 22, wherein the method comprises:
    positioning the siding tool in an inverted position flat against the wall or the first siding panel; and
    marking a measurement on the wall or the first siding panel using the lip.

* * * * *